US005189442A

United States Patent [19]

Herbert

[11] Patent Number: 5,189,442

[45] Date of Patent: Feb. 23, 1993

[54] FRANKING MACHINE WITH INK JET PRINTER UTILIZING MELTED SOLID INK

[75] Inventor: Raymond J. Herbert, Leigh-on-Sea, United Kingdom

[73] Assignee: Alcatel Business Systems Limited, Essex, United Kingdom

[21] Appl. No.: 575,673

[22] Filed: Aug. 31, 1990

[30] Foreign Application Priority Data

Sep. 4, 1989 [GB] United Kingdom ................. 8919917

[51] Int. Cl.[5] ............................................. G01D 15/16

[52] U.S. Cl. ................................. 346/140 R; 346/1.1; 364/464.02

[58] Field of Search ............................ 346/140 R, 1.1; 364/464.02; 250/568

[56] References Cited

U.S. PATENT DOCUMENTS

| | | | |
|---|---|---|---|
| 4,449,052 | 5/1984 | Krieg | 250/568 |
| 4,481,604 | 11/1984 | Gilham et al. | 364/900 |
| 4,558,332 | 12/1985 | Takahashi | 346/140 R |
| 4,590,494 | 5/1986 | Ichihashi et al. | 346/140 R |
| 4,626,874 | 12/1986 | Murai et al. | 346/140 R |
| 4,821,049 | 4/1989 | Eckl | 346/134 |
| 4,907,013 | 3/1990 | Hubbard et al. | 346/1.1 |
| 4,968,994 | 11/1990 | Hock et al. | 346/1.1 |
| 5,040,000 | 8/1991 | Yokoi | 346/140 R |

FOREIGN PATENT DOCUMENTS

| | | | |
|---|---|---|---|
| 51-21592 | 6/1976 | Japan . | |
| 0115863 | 7/1984 | Japan | 346/140 R |
| 0113558 | 5/1987 | Japan | 346/140 R |
| 0097823 | 1/1984 | United Kingdom | 346/140 R |

OTHER PUBLICATIONS

IBM Tech. Bulletin, vol. 16, No. 10, Mar. 1974, "Capacitive Ink Level Detector", D. W. Phillips.

*Primary Examiner*—Benjamin R. Fuller
*Assistant Examiner*—Eric Frahm
*Attorney, Agent, or Firm*—Shoemaker and Mattare, Ltd.

[57] ABSTRACT

A franking machine is disclosed in which the franking impression is printed by means of an ink jet print head. Debris from mail items which is liable to be deposited on the nozzles of the print head is removed periodically by a cleaning device operated in gaps between feeding of successive mail items. In the event that a gap does not occur, the feeding means is controlled periodically to cause occurrence of a gap. The ink jet print head may utilize solid ink which is heated to melt it for ejection in drops from the nozzles.

9 Claims, 3 Drawing Sheets

FRANKING MACHINE WITH INK JET PRINTER UTILIZING MELTED SOLID INK

BACKGROUND OF THE INVENTION

This invention relates to franking machines and in particular to the printing of franking impressions on mail items.

DESCRIPTION OF THE RELATED ART

In known franking machines the franking impression is printed by means of a rotatable print drum. The drum carries a printing plate which prints fixed format information required for the franking impression and a number of selectably settable print wheels for printing variable information such as the value of the franking and the date. Prior to printing a franking the print wheels for printing the franking value are set to the selected value. The drum is then rotated to bring the printing plate and print elements on the print wheels into contact with an inking device and then into printing engagement with a mail item to be franked. Such printing drum require complex mechanisms for the setting of the print wheels and for ensuring that the print wheels are retained in their selected set positions until printing is completed to prevent attempts to fraudulently set the wheels to print values of franking other than those registered by the metering device of the franking machine. Frequently the printing drum carries an additional printing plate for the printing of advertising material, for example the users logo, alongside the franking impression. The mechanical construction of the print drum and the use of printing plates does not allow flexibility in choice of format of the printed impression.

In order to facilitate printing of franking impressions together with advertising material in which the format and information content may be easily changed as required it has been proposed to use a printing device in which printing is effected by ink jet printing elements. While ink jet printing devices are satisfactory for high speed printing in situations where the print receiving medium can be assured to meet specified criteria, such as in computer output printers, it has been found that ink jet printers have not been satisfactory for use in mail systems where the quality of the surface of the envelopes of the mail items may vary widely. The variation in quality of the envelopes results in unreliable printing on some envelopes. Also loose particles carried by the envelopes results in blockage of the ink nozzles of the ink jet elements.

SUMMARIES OF THE INVENTION

According to one aspect of the invention a franking machine includes a print head including a plurality of ink jet nozzles; a receptacle for solid ink pellets communicating with the nozzles; heating means operable to melt solid ink pellets in the receptacle to enable the melted ink to pass to the nozzles; a plurality of piezo-electric devices associated one with each nozzle respectively and selectively operable to eject ink drops from said nozzles; means operable to feed mail items past the nozzles in spaced relationship thereto; and means operative during feeding of a mail item past the nozzles to operate the piezo-electric devices selectively to eject ink drops to form a franking impression on the mail item.

Preferably cleaning means are provided operable to clean the nozzles. The cleaning means may include a cleaning pad and means actuable to move the pad across the nozzles. The nozzles may be located in a line and the cleaning pad may be rotatable about an axis extending parallel to the line of nozzles.

According to a second aspect of the invention a franking machine includes a print head including a plurality of ink jet nozzles; a receptacle for ink communicating with the nozzles; a plurality of piezo-electric devices associated one with each nozzle respectively and selectively operable to eject ink drops from said nozzles; means operable to feed mail items past the nozzles in spaced relationship thereto; means operative during feeding of a mail item past the nozzles to operate the piezo-electric devices selectively to eject ink drops to form a franking impression on the mail item and cleaning means operable to clean the nozzles.

It is preferred to sense gaps between successive mail items and to operate the cleaning means when a gap of sufficient length is sensed.

BRIEF DESCRIPTION OF THE DRAWING

An embodiment of the invention will now be described with reference by way of example to the drawings in which.

DESCRIPTION OF THE PREFERRED EMBODIMENT

Figures 1, 2:
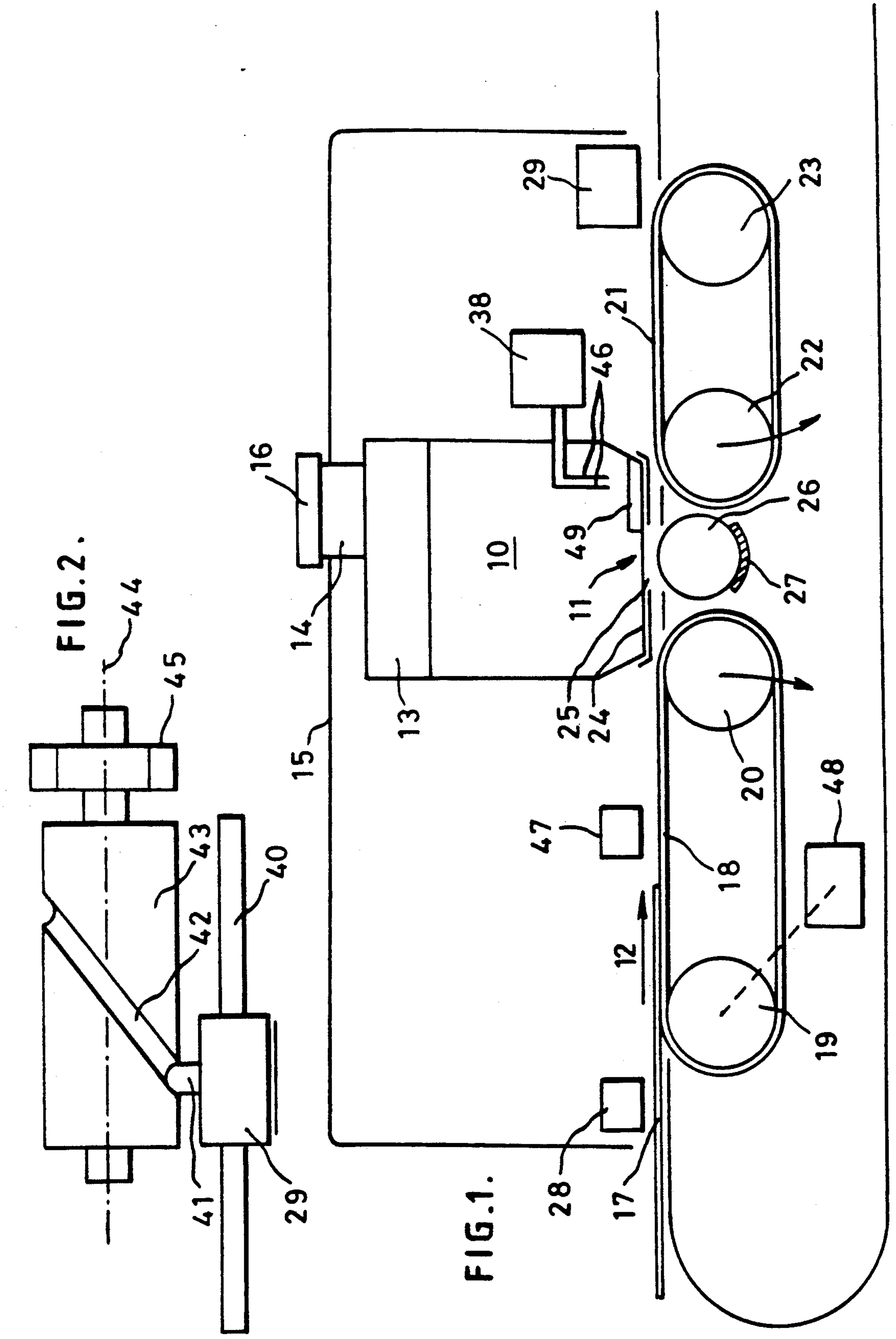
FIG. 1 illustrates the printing device and feed mechanism for mail items.
FIG. 2 illustrates a mechanism for scanning a sensor across a printed franking impression.

Referring first to FIG. 1, a franking machine is provided with a print head 10 provided with a plurality of ink nozzles 11 located along a line, indicated by reference 11, extending transversely to a feed direction for mail items indicated by arrow 12. The ink head has a receptacle 13 for holding ink in solid pellet form. A heating element 49 adjacent the bottom of the receptacle 13 melts the ink so that the ink flows into a collecting chamber for delivery to the nozzles. Ink is ejected selectively from the nozzles by actuation of piezo-electric devices, a separate piezo-electric device being provided for each nozzle. Actuation of the piezo-electric devices creates a restriction in the associated nozzle which rapidly applies a compressive force to the ink and thereby ejects a droplet of ink from the nozzle. In order to enable a high definition of printing to be obtained, the spacing of the nozzles along the line 11 is such that there are at least four nozzles per millimeter of length of the line 11. Replenishment of ink is effected by means of a filler 14 extending through a cover 15 for the franking machine and closed by means of a removable cap 16.

Mail items 17 are fed to the print head 10 in the direction of arrow 12 by means of a first feed belt 18 running on rollers 19, 20 and are fed away from the print head by means of a second feed belt 21 running on rollers 22, 23. Where required pressure rollers, not shown, may be provided to co-operate with the feed belts in order to ensure that the mail items are engaged and fed by the belts. During feeding of the mail items past the print head, the mail items are spaced away from the nozzles of the print head by means of a plate 24. The plate 24 has a guide surface lying in a plane spaced from the line of nozzles and has an aperture 25 in the region of the ink jet nozzles to permit ink ejected from the nozzles to impact on the mail item being fed past the print head. The aperture 25 extends downstream of the nozzles, in the direction of arrow 12, a sufficient distance to allow the ink to solidify prior to being engaged by the downstream part of the plate. The spacing of the mail items from the nozzles by the plate 24 is of relatively small dimension and hence of necessity the plate 24 must be thin. In order to increase the rigidity of the plate 24 it may be formed with ribs. The rollers 20 and 22 of the feed belts are resiliently mounted such that they can be deflected downwards, as seen in FIG. 1, away from the plate 24 so as to accommodate varying thicknesses of the mail items. Thus the front face of each mail item on which printing is to be effected is maintained in engagement with the plate 24 and hence is maintained at a uniform distance from the nozzles.

It will be appreciated that prior to printing it is necessary the ink supplied to the nozzles has been melted. In order to reduce the delay that this would entail from switching on of the franking machine, a standby mode may be provided. During this standby mode, power is applied to the ink melting element to make the ink in the reservoir available for printing. When it is intended to use the franking machine for franking mail items, the machine is switched to operating mode in which the power applied to the heating element is increased to raise the ink to the temperature required for operation of the print head.

It is preferred to provide means for indicating when the level of ink in the print head reservoir reaches a low level so as to provide warning to a user that replenishment of the ink is needed. This may be achieved by means of a pair of electrodes 46 located in the reservoir adjacent the bottom thereof. The capacitance between the electrodes due to the presence of molten ink between the electrodes is different from the capacitance between the electrodes in the absence of ink. A circuit 38 detects this change of capacitance and inputs a signal to a microprocessor carrying out accounting and control functions in the meter of the franking machine. The meter includes a display device operated by the microprocessor for display of data and information to a user of the machine. When the circuit detects a low ink level, the microprocessor operates the display device to display a low ink level warning to the user. Preferably the electrodes are located at such a position in the reservoir that the low ink level warning is provided when there is sufficient ink remaining to print franking impressions on approximately five hundred mail items.

Due to the required rapid transit of mail items past the print head and due to the low quality of paper used for some items a significant quantity of paper debris is generated. This debris tends to accumulate in the region of the ink jet nozzles and has the effect of reducing the quality of the printing. In order to reduce the accumulation of debris cleaning means are provided to clean the region of the nozzles frequently. The cleaning means includes a roller 26 positioned opposite the nozzles and rotatable on an axis extending transverse to the direction of feed, arrow 12, and parallel to the line 11 of nozzles. The surface of the roller 26 normally lies below the mail items as they pass the print head. Secured to the curved surface of the roller 26 is a wiper pad 27 which extends around a portion of the curved surface, for example around a quarter of the surface. When it is desired to clean the print head the roller 26 is moved toward the print head and is rotated to draw the pad 27 across the surface of the head and thereby paper debris accumulated thereon. It is desirable to carry out this cleaning operation by rotation of the roller 26 at substantially regular intervals related to the number of mail items fed through the machine. Typically the cleaning is carried out after 100 mail items have been fed past the print head since the last cleaning. A sensor 28 is provided upstream of the print head to detect gaps between mail items being fed to the print head. When a gap of sufficient length between successive mail items is detected the cleaning roller 26 is actuated in the interval between those successive items passing the print head. Usually the machine will await the occurrence of a gap of sufficient length for operation of the cleaning roller. In this way there is no interruption to the usage of the machine for franking mail items. However, if no gap of sufficient length is detected and the number of mail items fed past the print head has exceeded a predetermined number, the feed belt 18 may be decelerated or stopped for a short period in order to ensure that a gap of sufficient length between successive items is obtained to permit cleaning to be effected. While it is convenient to carry the cleaning pad 27 on a roller, the pad may be carried by any other suitable means, for example a segment of a cylinder, for rotation about an axis.

Since the franking machine is printing postal value for which a user is required to pay the postal authority, it is desirable to ensure that the franking impressions are properly printed and do not contain un-printed portions due to non-operation of one or more of the printing nozzles. A preferred manner of checking the operation of the printing nozzles is to print a bar code, which may represent the value of the franking and any other data as desired, on each mail item. The bars of the code are printed by operation of all the nozzles and each of the bars extend transversely of the mail item, relative to the direction of feeding, for the full depth of the franking impression. The bar code may be printed in advance of printing the franking impression or vice versa. The operation of the printing nozzles can then be checked by optically sensing the bar code along a line extending in the direction of feed of the mail items by means of a sensor 29. In sensing of the bar code on successive mail items, the sensor 29 successively senses different lines along the code. Thus the sensing progressively moves from, say, the top edge to the bottom edge of the bar code and this sequence would then repeat for succeeding mail items. This may be effected conveniently, as shown in FIG. 2, by scanning the sensor 29 transversely of the direction of feed of the mail items across the width of the printed franking impression. For this purpose, the sensor is mounted to slide transversely on a guide rod 40 and a follower pin 41 on the sensor body engages in an endless spiral groove 42 in a cylindrical drum 43. The drum 43 is rotated on its axis 44 to cause the sensor to oscillate transversely across the franking impression. The drum may be driven by a stepper motor (not shown) or may be driven by means of gearing 45 from the drive for the mail item feed. In this manner the parts of the bar code printed by different ones of the nozzles are optically sensed and checked that they are properly printed. If more than a predetermined number of nozzles, or more than a predetermined number of adjacent or nearby nozzles, are revealed to be inoperative further printing is inhibited. Instead of scanning the franking impression by moving the sensor across the impression, the sensor may remain stationary and the scanning may be effected optically.

The print head is controlled by print signals which are sent to the print head from the microprocessor controller. These print signals may be sent either serially or in parallel depending upon the rate of handling of mail items which is required. Usually a serial arrangement will be used but where a high rate of handling mail items is required, the serial arrangement is too slow and becomes necessary to us a parallel arrangement.

Figure 3:
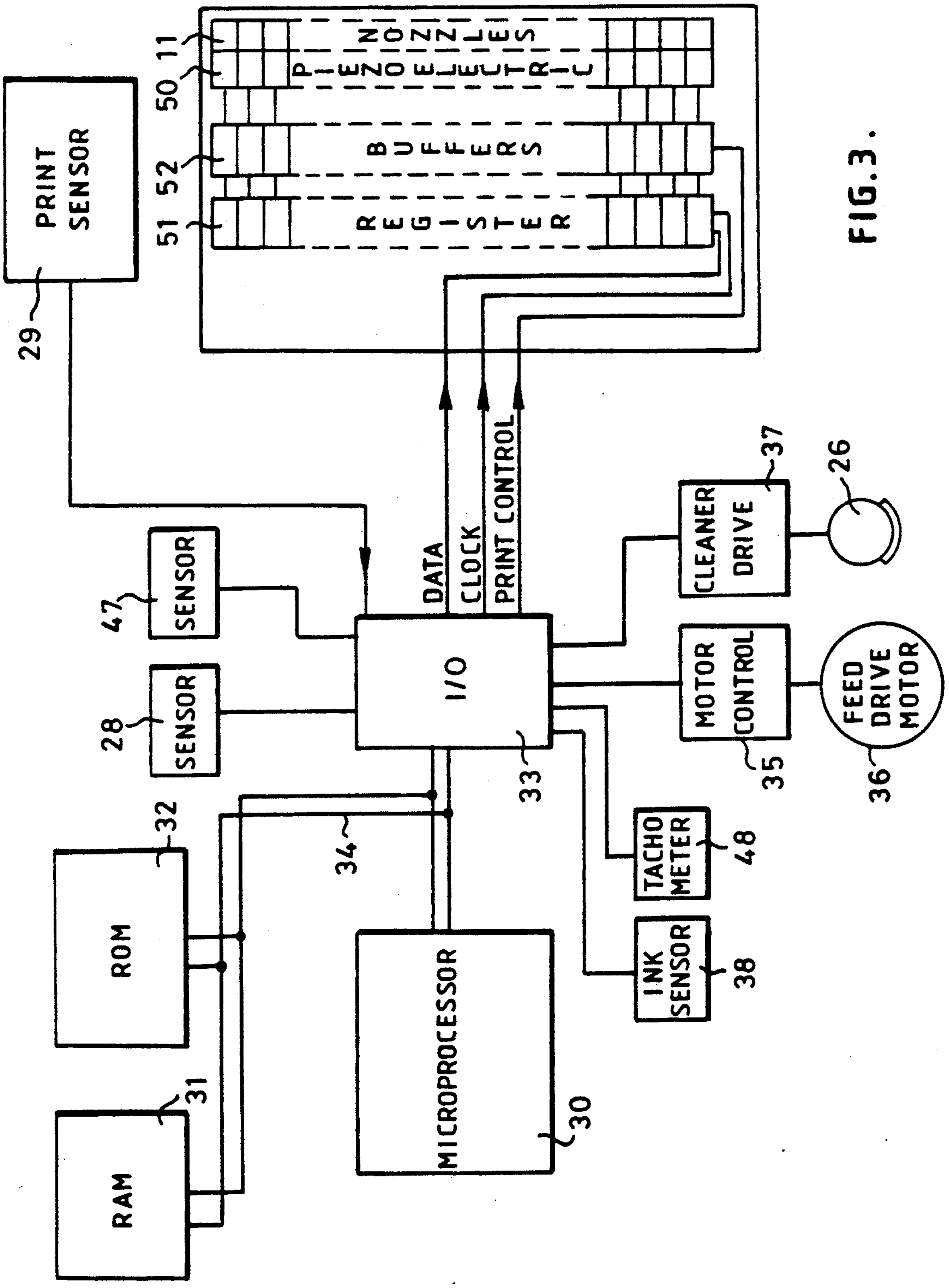
FIG. 3 is a block diagram of a circuit for controlling the print head with serial print signals and FIG. 4 is a block diagram of a circuit for controlling the print head with parallel print signals.

Referring to FIG. 3, a microprocessor 30 for carrying out accounting and control functions in the franking machine is provided with random access memory 31, nonvolatile read only memory 32 and an input/output interface 33 connected to the microprocessor by means of a bus 34 for carrying data, control and clock signals. Operation of the print head 10 is controlled by the microprocessor 30 outputting signals comprising clock, print control and print data signals via the input/output interface 33. The print data signals are loaded serially into a shift register 51 which has a plurality of storage stages associated one with each print nozzle 11 respectively. When the shift register 51 has been loaded with print data relating to one line of printing, the stages of the register are read out in parallel to operate, via butters 52, the piezo-electric devices 50 of the print nozzles 11, the devices being fired by a control signal when loading of the print data in the buffers is complete.

After the print nozzles have been operated to print the bar code on the mail item, the optical sensing device 29 is operated by the microprocessor 30 via the input/output interface to read the bar code and signals from the sensing device 29 in response to reading the bar code are input to the microprocessor to effect a check on the operation of the print nozzles as described hereinbefore. The microprocessor also controls a motor control circuit 35 to control operation of an electric motor 36 driving the rollers 19 and 23 on which the feed belts 18, 21 respectively run. The microprocessor 30 receives signals from the mail item sensor 28 to determine the number of mail items passed to the printing head and when this number reaches a predetermined value the microprocessor controls the drive to the feed belt 18 to cause occurrence of a gap between mail items in which cleaning of the print head may be effected and the microprocessor outputs control signals to an actuator and drive 37 for the cleaning roller 26. Also the microprocessor 30 periodically checks the capacitance of the electrodes 46 of the low ink level warning device 38.

Figure 4:
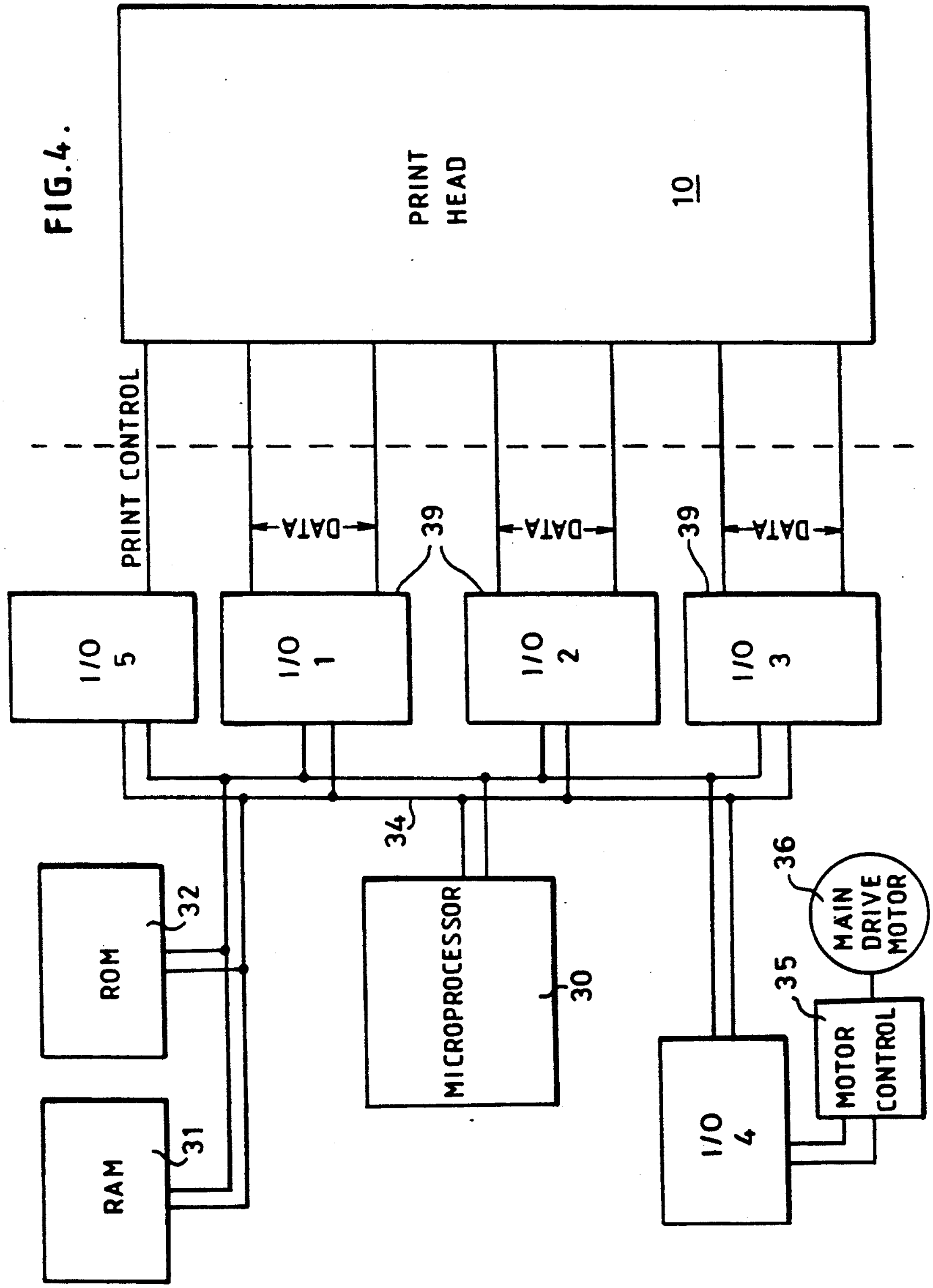

FIG. 4 shows a parallel arrangement for outputting print data signals to the piezo-electric devices of the print nozzles. Generally the arrangement is similar to that of the serial arrangement shown in FIG. 2 but, instead of a single input/output interface for sending print data signals serially in respect of all the nozzles of the print head, a plurality of input/output interfaces 39 are provided, each interface 39 being associated with a different one of groups of the print nozzles. In this parallel arrangement there is no shift register in the print head and the print data signals from the interfaces are applied direct to buffers in the print head for operation of the piezo-electric devices.

In order to cause the print head to be operated to print the franking impression at the required position lengthwise of the mail item 17, the leading edge of the mail item is sensed by a sensor 47 positioned upstream of the print head. Signals output from means 48, such as a tachometer, operating in synchronism with the feed belt 18 are utilizes together with sensing of the leading edge by the sensor 47 to cause the microprocessor to initiate operation of the print head when the mail item is correctly positioned relative to the print head. Signals from the means 48 are also used to synchronise repeated operation of the print head with feeding of the mail item past the print head. While separate sensors 28 and 47 have been shown, it is to be understood that when desired and where the design of the franking permits, the functions performed by the two sensors may be performed by a single sensor.

While the provision of cleaning means to remove debris accumulated in the region of the ink jet nozzles has been described in relation to an ink jet print head which utilizes ink which is melted from its normal solid state by the application of heat, it is to be understood that the cleaning means may be provided in relation to ink jet print heads which utilizes ink which in its normal state is liquid and does not require to be melted.

I claim:

1. A franking machine including a stationary print head comprising a plurality of ink jet nozzles; a receptacle for solid ink pellets, said receptacle communicating with said nozzles; heating means to melt the solid ink pellets contained in the receptacle so that the melted ink is enabled to flow to said nozzles; each nozzle being provided with a piezo-electric device; a guide surface in spaced relation to said nozzles; means operable to feed a mail item in engagement with said guide surface past said nozzles; means to operate the piezo-electric device of selected ones of said nozzles to eject droplets of ink from said selected nozzles onto the mail item during feeding of the mail item past said nozzles and cleaning means extending in opposition to all said plurality of nozzles of the print head and during printing on the mail item, said cleaning means remaining located in opposition to said nozzles and spaced from said nozzles to provide a passage for mail items between said nozzles and said cleaning means and said cleaning means being engageable with said plurality of ink jet nozzles by rotation thereof and being rotatable relative to said nozzles while in engagement with all said nozzles to clean debris from said nozzles.

2. A franking machine as claimed in claim 1 wherein the plurality of nozzles are located in a line extending transversely of the direction of feed of the mail items and the cleaning means includes a pad carried by a roller rotatable about an axis parallel to the line of nozzles.

3. A franking machine including a stationary print head comprising a plurality of ink jet nozzles; a receptacle for solid ink pellets, said receptacle communicating with said nozzles; heating means to melt the solid ink pellets contained in the receptacle so that the melted ink is enabled to flow to said nozzles; each nozzle being provided with a piezo-electric device; a guide surface in spaced relation to said nozzles; means operable to feed a mail item in engagement with said guide surface past said nozzles; means to operate the piezo-electric device of selected ones of said nozzles to eject droplets of ink from said selected nozzles onto the mail item during feeding of the mail item past said nozzles; cleaning means located in opposition to said nozzles of said print head and during printing on the mail item said cleaning means remaining located in opposition to said nozzles and spaced from said nozzles to permit the mail item to be fed between said nozzles and said cleaning means;

said cleaning means being engageable with said ink jet nozzles and rotatable relative to said nozzles while in engagement with said nozzles to clean debris from said nozzles; sensor means responsive to spaces between successive mail items being fed by said feeding means and means operable in response to detection by said sensor means of a space greater than a predetermined length to drive said cleaning means to effect rotation of said cleaning means in engagement with said nozzles in the space between successive mail items.

4. A franking machine as claimed in claim 3 including a pair of relatively spaced electrodes located in the ink receptacle; the melted ink in the receptacle extending between said spaced electrodes to an extent dependent upon the level of melted ink in said receptacle and said electrodes having a capacitance therebetween dependent upon the level of ink in the receptacle and means responsive to the magnitude of said capacitance between said electrodes to generate an ink level signal.

5. A franking machine including a stationary print head comprising a plurality of ink jet nozzles; a receptacle for solid ink pellets, said receptacle communicating with said nozzles; heating means to melt the solid ink pellets contained in the receptacle so that the melted ink is enabled to flow to said nozzles; each nozzle being provided with a piezo-electric device; a guide surface in spaced relation to said nozzles; means operable to feed a mail item in engagement with said guide surface past said nozzles; means to operate the piezo-electric device of selected ones of said nozzles to eject droplets of ink from said selected nozzles onto the mail item during feeding of the mail item past said nozzles; cleaning means located in opposition to said nozzles of said print head and during printing on the mail item said cleaning means remaining located in opposition to said nozzles and spaced from said nozzles to permit the mail item to be fed between said nozzles and said cleaning means; said cleaning means being engageable with said ink jet nozzles and rotatable relative to said nozzles while in engagement with said nozzles to clean debris from said nozzles; sensor means responsive to feeding of a predetermined number of mail items past said print head; cleaning drive means operable to effect rotation of said cleaning means in engagement with said nozzles; and control means responsive to said sensor means sensing said predetermined number of mail items to control said feed means to delay feeding of a mail item succeeding said predetermined number of mail items and to operate said cleaning drive means during a gap between said mail item succeeding said predetermined number of mail items and a last mail item of said predetermined number of mail items produced by the delay in feeding the succeeding mail item.

6. A franking machine as claimed in claim 5 including a pair of relatively spaced electrodes located in the ink receptacle; the melted ink in the receptacle extending between said spaced electrodes to an extent dependent upon the level of melted ink in said receptacle and said electrodes having a capacitance therebetween dependent upon the level of ink in the receptacle and means responsive to the magnitude of said capacitance between said electrodes to generate an ink level signal.

7. A franking machine including a stationary print head comprising a plurality of ink jet nozzles; a receptacle for ink, said receptacle communicating with said nozzles; each nozzle being provided with a piezo-electric device; a guide surface in spaced relation to said nozzles; means operable to feed a mail item in engagement with said guide surface past said nozzles; means to operate the piezo-electric device of selected ones of said nozzles to eject droplets of ink from said selected nozzles onto the mail item during feeding of the mail item past said nozzles; cleaning means located in opposition to said nozzles of said print head and during printing on the mail item said cleaning means remaining located in opposition to the nozzles and spaced from said nozzles to permit the mail item to be fed between said nozzles and said cleaning means; said cleaning means being engageable with said ink jet nozzles and rotatable while engaged with said nozzles to clean debris from said nozzles; sensor means responsive to spaces between successive mail items being fed by said feeding means and means operable in response to detection by said sensor means of a space greater than a predetermined length to drive said cleaning means to effect rotation of said cleaning means in engagement with said nozzles.

8. A franking machine including a stationary print head comprising a plurality of ink jet nozzles; a receptacle for ink, said receptacle communicating with said nozzles; each nozzle being provided with a piezo-electric device; a guide surface in spaced relation to said nozzles; means operable to feed a mail item in engagement with said guide surface past said nozzles; means to operate the piezo-electric device of selected ones of said nozzles to eject droplets of ink from said selected nozzles onto the mail item during feeding of the mail item past said nozzles; cleaning means located in opposition to said nozzles of said print head and during printing on the mail item said cleaning means remaining located in opposition to the nozzles and spaced from said nozzles to permit the mail item to be fed between said nozzles and said cleaning means; said cleaning means being engageable with said ink jet nozzles and rotatable while engaged with said nozzles to clean debris from said nozzles; means responsive to feeding of a predetermined number of mail items past said print head; cleaning drive means operable to effect rotation of said cleaning means in engagement with said nozzles; and control means responsive to said sensor means sensing said predetermined number of mail items to control said feed means to delay feeding of a succeeding mail item and to operate said cleaning drive means during a gap between successive mail items produced by the delay in feeding said succeeding mail item.

9. A franking machine including an elongate planar guide having an aperture therein; a print head comprising a plurality of ink jet nozzles; said ink jet nozzles being located in a row extending transversely relative to said guide aligned with said aperture in the guide, said nozzles being spaced from the plane of said guide and being stationary relative to said guide; a receptacle for solid ink pellets, said receptacle communicating with said nozzles; heating means to melt the solid ink pellets contained in the receptacle to enable the melted ink to flow to said nozzles; each nozzle being provided with a piezo-electric device; means operable to feed a mail item along said guide with a front face of said mail item in engagement with said guide and facing said nozzles; means to operate the piezo-electric device of selected ones of said nozzles to eject droplets of ink from said selected nozzles through said aperture in said guide onto said front surface of said mail item during feeding of the mail item along said guide past said aperture; cleaning means located in alignment with said aperture and opposed to said ink jet nozzles; said cleaning means comprising a cleaning element rotatable about an axis parallel to said row of nozzles; said cleaning means having a first non-operative position in which a cleaning element is spaced from the plane of said guide to provide a passage for mail items between said cleaning element and said guide and said cleaning means having a second operable position in which said cleaning means is being rotatable about said axis to move said cleaning element into engagement with said nozzles and relative to the nozzles while in engagement with the nozzles to clean debris from the nozzles.

* * * * *